(12) United States Patent
Hongerholt et al.

(10) Patent No.: US 7,257,470 B2
(45) Date of Patent: Aug. 14, 2007

(54) FAULT ISOLATION METHOD AND APPARATUS IN ARTIFICIAL INTELLIGENCE BASED AIR DATA SYSTEMS

(75) Inventors: Derrick David Hongerholt, Eagan, MN (US); Dennis James Cronin, Shakopee, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 10/977,442

(22) Filed: Oct. 29, 2004

(65) Prior Publication Data

US 2007/0150122 A1 Jun. 28, 2007

(51) Int. Cl.
*G01C 23/00* (2006.01)
(52) U.S. Cl. ............................................ 701/3; 701/29
(58) Field of Classification Search .............. 701/1–3, 701/6, 8, 29, 36, 40, 14; 702/138; 73/182
See application file for complete search history.

(56) References Cited

U.S. PATENT DOCUMENTS

| | | | |
|---|---|---|---|
| 3,318,146 A | 5/1967 | DeLeo et al. | |
| 4,096,744 A | 6/1978 | DeLeo et al. | 73/180 |
| 4,303,978 A | 12/1981 | Shaw et al. | 364/453 |
| 4,378,696 A | 4/1983 | DeLeo et al. | 73/180 |
| 4,378,697 A | 4/1983 | DeLeo et al. | 73/180 |
| 4,615,213 A | 10/1986 | Hagen | |
| 4,644,538 A | 2/1987 | Cooper et al. | 371/9 |
| 4,836,019 A | 6/1989 | Hagen et al. | |
| 4,987,542 A | 1/1991 | Tran | |
| 5,205,169 A | 4/1993 | Hagen | 73/180 |
| 5,319,970 A | 6/1994 | Peterson et al. | 73/182 |
| 5,369,993 A | 12/1994 | Hagan | 73/178 R |
| 5,423,209 A | 6/1995 | Nakaya et al. | 73/182 |
| 5,485,412 A | 1/1996 | Sarkkinen et al. | 364/725.05 |
| 5,610,845 A | 3/1997 | Slabinski et al. | 364/565 |
| 5,616,861 A | 4/1997 | Hagen | 73/180 |
| 5,710,559 A | 1/1998 | Krogmann | 340/963 |

(Continued)

FOREIGN PATENT DOCUMENTS

| | | |
|---|---|---|
| DE | 37 27 906 | 3/1989 |
| DE | 44 10 709 A1 | 10/1995 |
| EP | 1 256 811 A2 | 11/2002 |
| EP | 1 293 784 A2 | 3/2003 |
| GB | 1176381 A | 2/1967 |
| RU | 2 041 136 C1 | 8/1995 |
| RU | 2 103 718 C1 | 1/1998 |
| WO | WO99/32963 | 7/1999 |

OTHER PUBLICATIONS

Sastry et al., C. V., "Failure management scheme for use in a flush air data", Aircraft Design 4, pp. 151-162, 2001, no month.

(Continued)

*Primary Examiner*—Y Beaulieu
(74) *Attorney, Agent, or Firm*—John D. Veldhuis-Kroeze; Westman, Champlin & Kelly, P.A.

(57) ABSTRACT

A method providing fault isolation, in an air data system which uses artificial intelligence to generate an air data parameter, includes generating the air data parameter as a function of a plurality of measured values such as static pressures. Then, estimates of each of the plurality of measured values is generated as a function of the generated air data parameter. Each measured value can then be compared to its corresponding estimate to determine if a difference between the measured value and its corresponding estimate exceeds a threshold and therefore indicates a fault in a device which provides the measured value.

21 Claims, 10 Drawing Sheets

U.S. PATENT DOCUMENTS

| | | | |
|---|---|---|---|
| 5,797,105 A | 8/1998 | Nakaya et al. ............... 701/7 |
| 5,819,188 A | 10/1998 | Vos ............................. 70/4 |
| 5,901,272 A | 5/1999 | Schaefer, Jr. et al. ....... 395/22 |
| 6,073,084 A | 6/2000 | Le Tron ...................... 702/94 |
| 6,253,166 B1 | 6/2001 | Whitmore et al. ........... 703/2 |
| 6,305,218 B1 | 10/2001 | Foster ........................ 73/178 R |
| 6,466,888 B1 | 10/2002 | McCool et al. ............. 702/144 |
| 6,561,020 B2 | 5/2003 | Glenney .................... 73/170.02 |
| 6,594,559 B2 | 7/2003 | Alwin et al. ................ 701/14 |
| 6,604,029 B2 | 8/2003 | Cronin et al. ............... 701/6 |
| 6,609,421 B2 | 8/2003 | Cronin et al. ............ 73/170.02 |
| 6,668,640 B1 | 12/2003 | Alwin et al. |
| 6,761,057 B2 | 7/2004 | Cronin et al. ............... 73/1.78 |
| 2003/0050766 A1* | 3/2003 | Cronin et al. ............... 702/181 |
| 2004/0122615 A1* | 6/2004 | Cronin et al. ............... 702/138 |
| 2006/0155506 A1* | 7/2006 | Cronin et al. ............... 702/138 |
| 2006/0212181 A1* | 9/2006 | Cronin et al. ............... 701/3 |

OTHER PUBLICATIONS

Stickney et al., T. M., "Total Temperature Sensors, Technical Report 5755, Revision C", Rosemount Aerospace/BFGoodrich, Jan. 1994.

"BFGoodrich-Aircraft Sensors Division Air Data System with SmartProbe for Fairchiled Dornier 728JET", BFGoodrich-Rosemount Aerospace, Addendum to D9820217 Rev. B, Oct. 1998, pp. 1-10.

"SmartProbe™ Air Data System for Embraer ERJ-170 & 190", BFGoodrich-Aircraft Sensors Division, Proposal D9920133, Apr. 1999, pp. 1-65.

F.W. Hagen and Dr. H. Seidel, "Deutsche Airbus Flight Test of Rosemount Smart Probe for Distributed Air Data System", IEEE AES Systems Magazine, Apr. 1994, pp. 7-14.

Bulletin 1013, "Pitot and Pitot-Static Probes", BFGoodrich (May 1998).

Bohloff et al., T. J., "Air Data Sensing from Surface Pressure Measurements Using a Neural Network Method", AIAA Journal, Vo. 36, No. 11, Nov. 1998, pp. 2094-2101.

Rohloff et al., T.J., "Fault-Tolerant Neural Network Algorithm for Flush Air Data Sensing", Journal of Aircraft, vol. 36, No. 3, May-Jun. 1999, pp. 541-549.

Rohloff, T.J., "Fault-Tolerance and Extrapolation Stability of a Neural Network Air-Data Estimator", Journal of Aircraft, vol. 36, No. 3, May-Jun. 1999, pp. 571-576.

"What is an Artificial Neural Network?", Battelle Memorial Institute (Copyright 1997), (Publication at least by Apr. 9, 2001), http://www.emsl.pnl.gov:2080/proj/neuron/neural/what.html.

C. Stergiou, "What is a Neural Network?", (Publication at least by Apr. 9, 2001), http://www.doc.ic.ac.uk/~nd/surprise_96/journal/vol1/cs11/article1.html.

D. Clark, "An Introduction to Neural Networks", Copyright 1991, 1997 (Publication at least by Apr. 9, 2001), http://members.home.net/neuralnet/introtonn/index.htm.

Search Report issued by the U.K. Patent Office in Application No. GB0519751.2.

Search Report issued by the U.K. Patent Office in Application No. GB0605207.0.

* cited by examiner

FAULT ISOLATION METHOD AND APPARATUS IN ARTIFICIAL INTELLIGENCE BASED AIR DATA SYSTEMS

BACKGROUND OF THE INVENTION

The present invention relates generally to air data sensing systems, such as flush air data systems (FADS), for use on an air vehicle. More particularly, the present invention relates to methods and apparatus for providing fault isolation in artificial intelligence based air data sensing systems, such as neural network based FADS.

A FADS typically utilizes several flush or semi-flush static pressure ports on the exterior of an air vehicle (such as an aircraft) to measure local static pressures at various positions. The pressure or pressure values measured by the individual ports are combined using some form of artificial intelligence algorithm(s), e.g., neural networks (NNs) for instance, to provide corrected air data parameters for the air vehicle. Corrected air data parameters represent global values of these parameters for the air vehicle. In this context, the term "global" refers to the air data measured far away from the air vehicle, i.e., "far field." In contrast, "local" parameters are measured at the surface of the air vehicle and are prone to flow field effects around the aircraft geometry. Local parameters are characterized, or corrected, in order to get global air data. Examples of these global air data parameters for the air vehicle include angle of attack (AOA), angle of sideslip (AOS), Mach number, etc. Other well known global air data parameters for the air vehicle can also be calculated. Another example of artificial intelligence algorithms which can be used with a FADS is support vector machines (SVMs), and artificial intelligence algorithms as referenced herein include these or other types of algorithms which learn by example.

Flush air data systems provide numerous advantages which make their use desirable for certain air vehicles or in certain environments. For example, the flush or semi-flush static pressure ports can result in less drag on the air vehicle than some other types of pressure sensing devices. Additionally, the flush or semi-flush static pressure sensing ports experience less ice build-up than some other types of pressure sensing devices. Other advantages of a FADS can include, for example, lower observability than some probe-style air data systems.

Consider a FADS which uses N flush static pressure ports for use on an aircraft. The individual ports each measure a single local pressure value related to their respective locations on the aircraft. Using neural networks or other artificial intelligence algorithms, these N pressure values can be used as inputs to provide the individual global air data parameters necessary for the air data system. To ensure accurate performance and to increase reliability, an important part of the overall air data system is the ability to isolate and detect faults to maintain accuracy and safety levels. Blocked ports or drifting sensors are examples of failures of hardware. Drifting sensors are sensors with an output which changes over time, due to calibration or other problems, relative to a desired or baseline output for a particular set of conditions. Undetected faults reduce the safety of the overall system, and since aircraft global parameters are derived using artificial intelligence with a large number of pressure sensing ports as inputs, failure of one or more of these ports can be difficult to identify and isolate. Therefore, there is a need for methods of fault isolation in artificial intelligence based FADS or other air data systems.

SUMMARY OF THE INVENTION

A method of providing fault isolation, in an air data system which uses artificial intelligence to generate a global air data parameter, includes generating the air data parameter as a function of a plurality of measured values. The measured values can be, for example, local static pressures or other measured values. Then, estimates of each of the plurality of measured values is generated as a function of the generated air data parameter. Each measured value can then be compared to its corresponding estimate to determine if a difference between the measured value and its corresponding estimate exceeds a threshold and therefore indicates a fault in a device (for example a pressure sensor) which provides the measured value.

BRIEF DESCRIPTION OF THE DRAWINGS

FIG. 3-1 is a diagrammatic illustration of a neural network, of the type which can be used in the FADS shown in FIG. 2, which uses pressure readings from flush static ports as inputs and which generates as an output one or more desired air data parameters.

FIGS. 3-2 through 3-6 are diagrammatic illustrations of neural networks, of the type which can be used for fault isolation in the FADS shown in FIG. 2, which use an output air data parameter from the neural network shown in FIG. 3-2 and some of the pressure readings from the flush static ports as inputs to generate an estimate of one of the pressure readings.

DETAILED DESCRIPTION OF THE PREFERRED EMBODIMENTS

Figure 1:
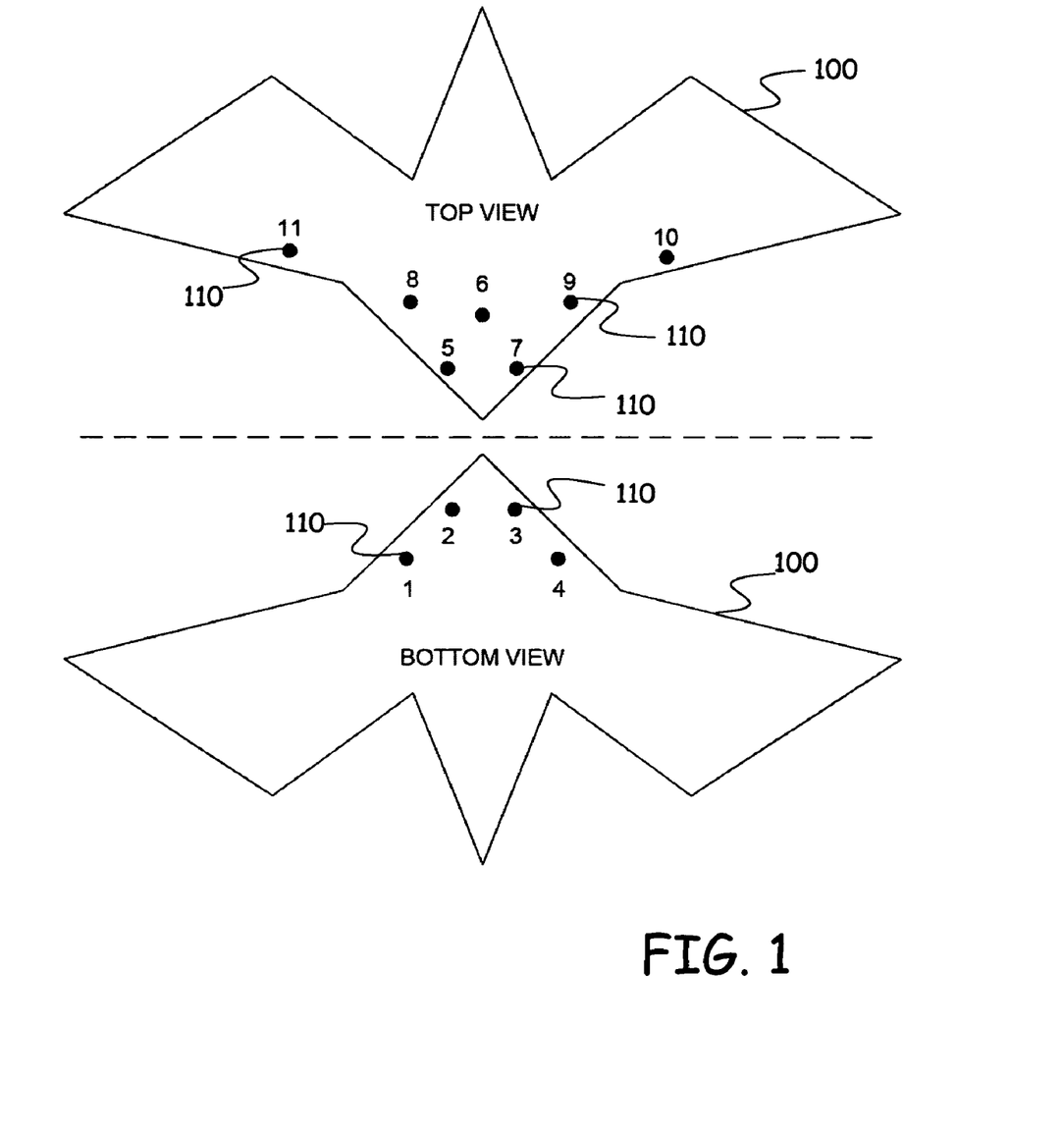
FIG. 1 is a diagrammatic illustration of flush air data pressure sensing ports on an air vehicle as seen from top and bottom views, respectively, in an example embodiment.

FIG. 1 is a diagrammatic illustration, in top and bottom views, of an aircraft or air vehicle 100 which employs a flush air data system (FADS) in accordance with embodiments of the present invention. Flush air data systems are generally known in the art. For example, aspects of one such FADS is described in U.S. Pat. No. 6,253,166 issued to Whitmore et al. on Jun. 26, 2001 and entitled STABLE ALGORITHM FOR ESTIMATING AIRDATA FROM FLUSH SURFACE PRESSURE MEASUREMENTS. Other examples of FADS or aspects of FADS are described in: (1) *Air Data Sensing from Surface Pressure Measurements Using a Neural Network*, Method AIAA Journal, vol. 36, no. 11, pp. 2094–2101 (8) (1 Nov. 1998) by Rohloff T. J., Angeles L., Whitmore S. A., and Catton I; (2) *Fault-Tolerant Neural Network Algorithm for Flush Air Data Sensing*, Journal of Aircraft, vol. 36, iss. 3, pp. 541–549(9) (1 May 1999) by Rohloff T. J., Whitmore S. A., and Catton I; (3) *Fault Tolerance and Extrapolation Stability of a Neural Network Air-Data Estimator*, Journal of Aircraft, vol. 36, iss. 3, pp. 571–576(6) (1

May 1999) by Rohloff T. J. and Catton I; and (4) *Failure Management Scheme for Use in a Flush Air Data System*, Aircraft Design 4, pp. 151–162 (2001) by C. V. Srinatha Sastry, K. S. Raman, and B. Lakshman Babu.

The FADS employed by air vehicle 100 includes, in one illustrated example, eleven flush (or semi-flush) static pressure sensing ports 110 positioned at various locations on the exterior of the vehicle. While FIG. 1 illustrates eleven static pressure sensing ports in particular locations, the particular number and locations of ports 110 can vary as desired for the particular air vehicle and application. Other examples of FADS as described herein use N static pressure sensing ports.

Figure 2:
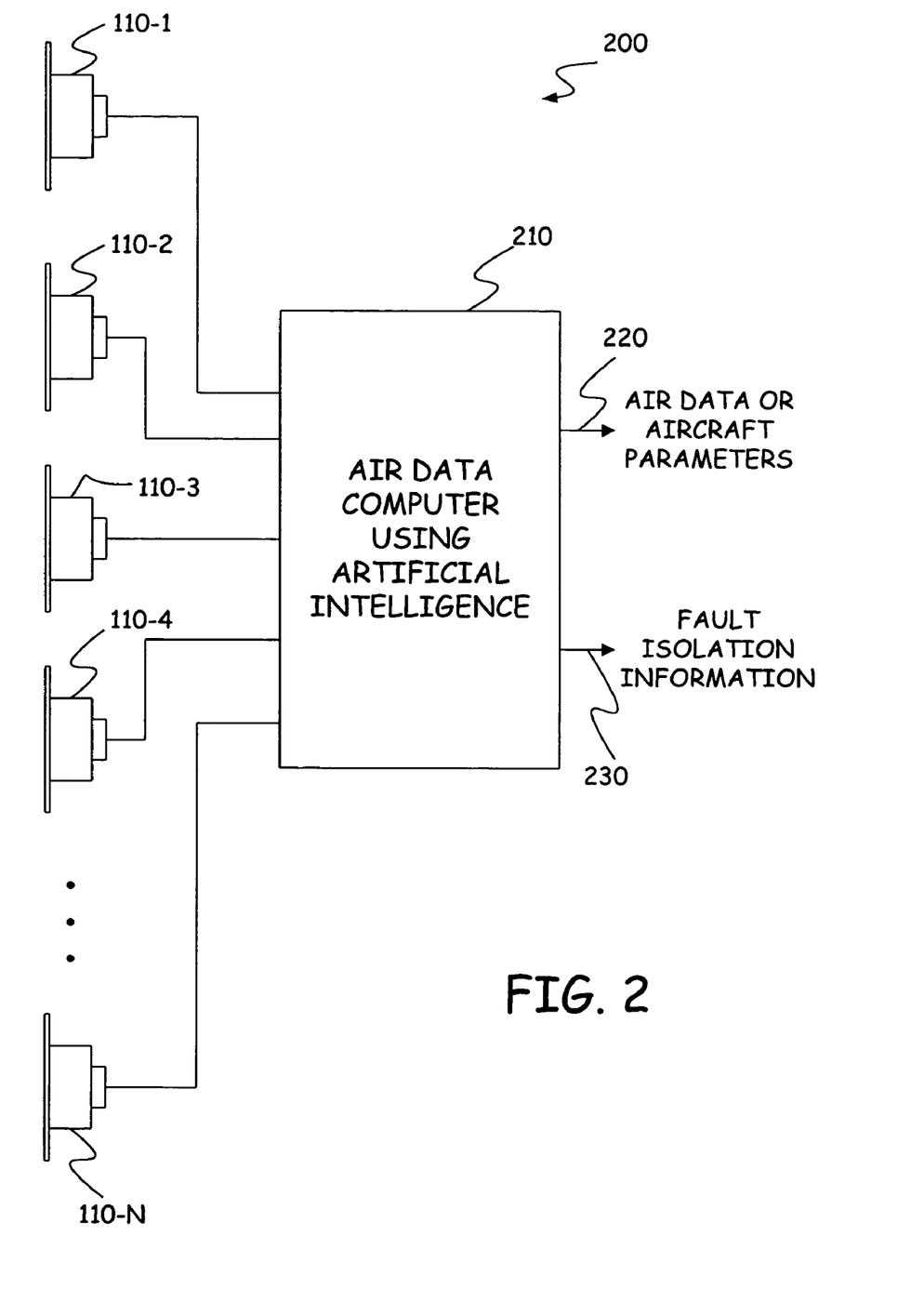
FIG. 2 is a diagrammatic illustration of a flush air data system (FADS) which is configured to implement fault isolation methods of the present invention.

As noted previously, in a FADS, the pressure or pressure values measured by the individual ports 110 are combined, using some form of artificial intelligence algorithm(s) (neural networks, support vector machines, etc), to generate global air data parameters. When one or more of the ports 110 experiences a blockage or other fault, it is beneficial to be able to isolate the failed or faulted port in order to ensure that the system performs up to a desired or necessary standard. FIG. 2 is a diagrammatic illustration of a FADS 200, in accordance with embodiments of the present invention, which provides such fault isolation. System 200 is one example embodiment of the FADS used on air vehicle 100. While FIG. 2 illustrates flush static pressure sensing ports, it is intended to represent air data systems more generally, including those using other types of pressure sensing devices. For example, the illustrated air data system can be an air data system which uses more conventional strut mounted or probe type pressure sensors.

As illustrated in FIG. 2, FADS 200 includes N flush static ports 210 (numbered 110-1 through 110-N, respectively). The individual ports each measure a single pressure value related to their respective locations on the air vehicle 100. Using one or more neural networks or other artificial intelligence based algorithms implemented in air data computer circuitry 210, these N pressure values can be combined or used to generate one or more air data parameters 220 as desired. Examples of these air data parameters include, but are not limited to, angle of attack (AOA), angle of sideslip (AOS), and Mach number. As will be described below in greater detail, the artificial intelligence algorithms implemented by air data computer 210 also provide fault isolation information 230 which is indicative of blocked or otherwise faulted static pressure sensing ports.

In accordance with one example embodiment of the invention, air data computer 210 is configured to implement multiple neural networks such as those illustrated in FIGS. 3-1 through 3-6. In this example, assume that there are only five flush static ports (i.e., N=5) corresponding to ports 110 shown in FIGS. 1 and 2. As illustrated in FIG. 3-1, these five ports each generate a corresponding pressure reading $p_i$ (for i between 1 and 5) which is provided to an input of a neural network 300-1. The five inputs corresponding to these five pressure readings are shown at reference numbers 301–305, respectively. The pressure readings at inputs 301–305 are then provided to internal nodes (for example nodes h1 through h6 shown at 311–316) of the neural network which apply predetermined weights and transfer functions to the pressure readings to generate intermediate outputs. In this illustrated example, the intermediate outputs provided by internal nodes 311–316 are provided as inputs to output node 320. Output node 320 applies predetermined weights and/or a transfer function to the intermediate outputs to generate a particular air data parameter (designated "$O_1$") as an output.

Figure 31:
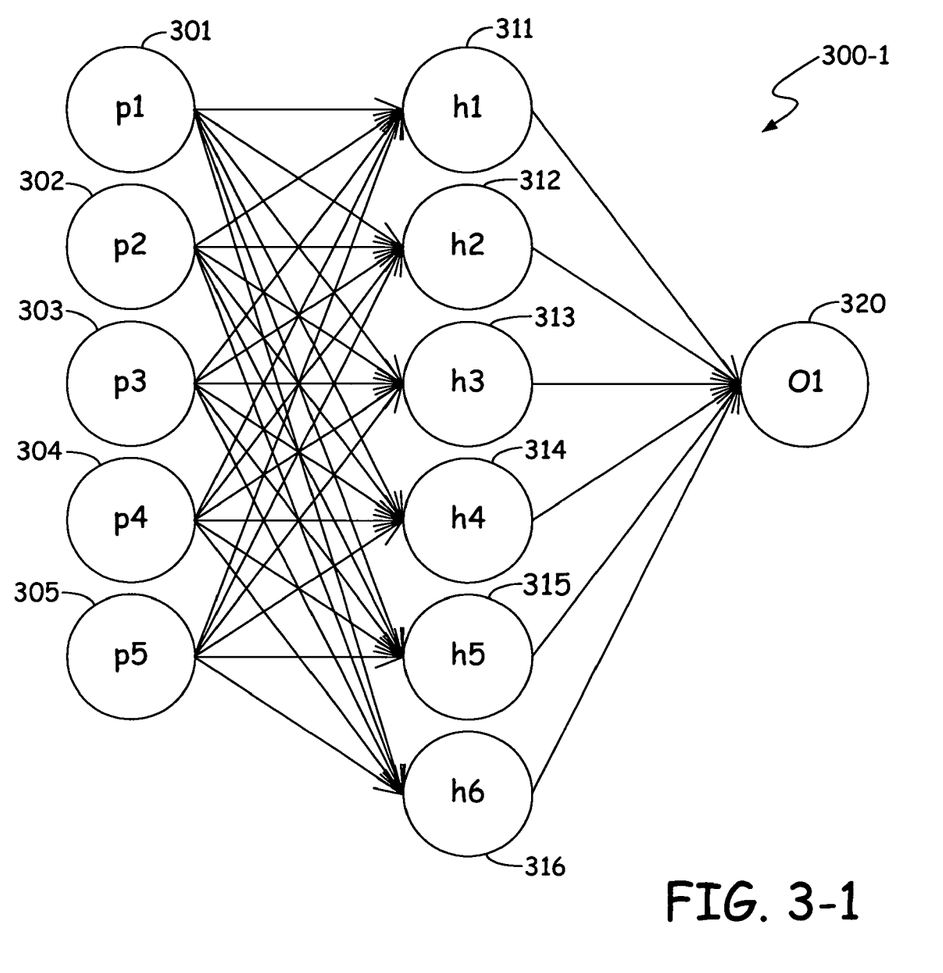

The air data parameter $O_1$ generated at output node 320 is one of the air data parameters 220 provided as an output from air data computer 210 shown in FIG. 2.

Although not illustrated in FIG. 3-1, the intermediate outputs of nodes 311–316 can be provided to any number of desired layers of nodes within neural network 300-1. Further, any of a variety of different types of neural networks or other artificial intelligence algorithms can be used. Further still, as is understood in the art, the weighting and transfer functions applied by various nodes of the neural network are predetermined by training the neural network with a large number of data sets of known inputs and the corresponding desired outputs. In the case of an air data system, the sets of known inputs and their corresponding outputs can be obtained from flight test data, wind tunnel data, or other sources. Also, while only one air data parameter ("O1") is output from neural network 300-1, other air data parameters can be provided by adding additional nodes and training the neural network accordingly. In the alternative, other separate neural networks can be used to generate the additional air data parameters.

The fault information 230 provided by air data computer 210 is in one example generated using the neural networks or artificial intelligence algorithms illustrated in FIGS. 3-2 through 3-6. The present invention provides fault isolation individually for each of the pressure sensing ports. For each particular one of the N ports, it provides the fault isolation by using measured pressures from all of the other N–1 ports, along with the desired air data parameter $O_1$ generated using neural network 300-1 shown in FIG. 3-1, as inputs to a neural network with an output which represents the particular port. Thus, N additional neural networks are used, with the output of each of the N neural networks representing the port not included. All pressure readings, $p_i$, are first used to derive the desired air data parameter, $O_1$ as shown in FIG. 3-1. Once $O_1$ is known, it is then used along with N–1 of the pressure readings to estimate the remaining pressure, $p_{est}$. The difference between the respective estimated pressure value and the measured pressure value should lie within some error value for the particular port, $\epsilon_i$, which is derived during the training procedure much like the accuracy for $O_1$ is derived. Therefore, the actual accuracy of the pressure reading $p_i$ is not the same as $\epsilon_i$. The latter takes into the account the interplay of $p_i$ with the FADS.

Figure 32:
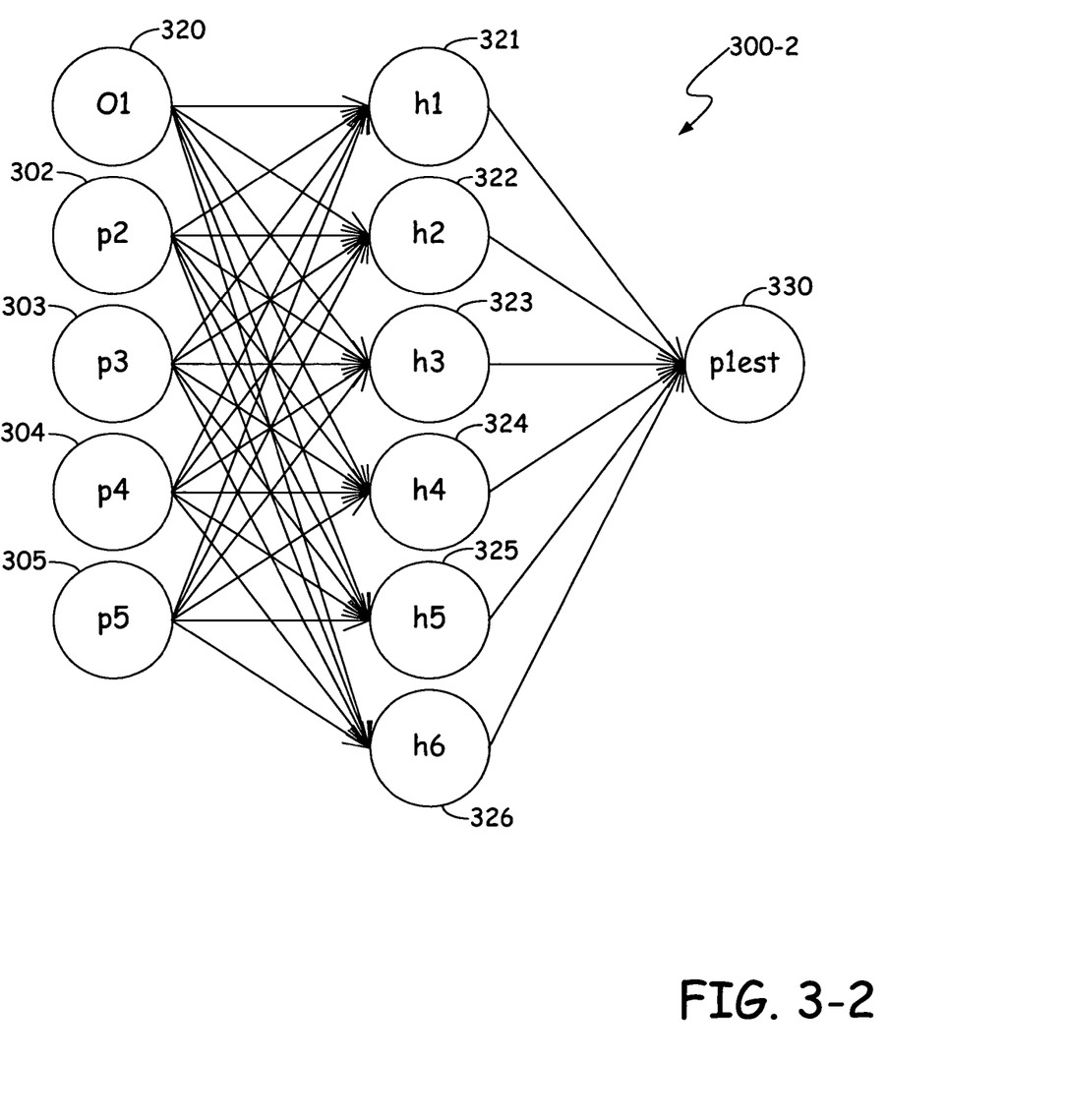
Figure 33:
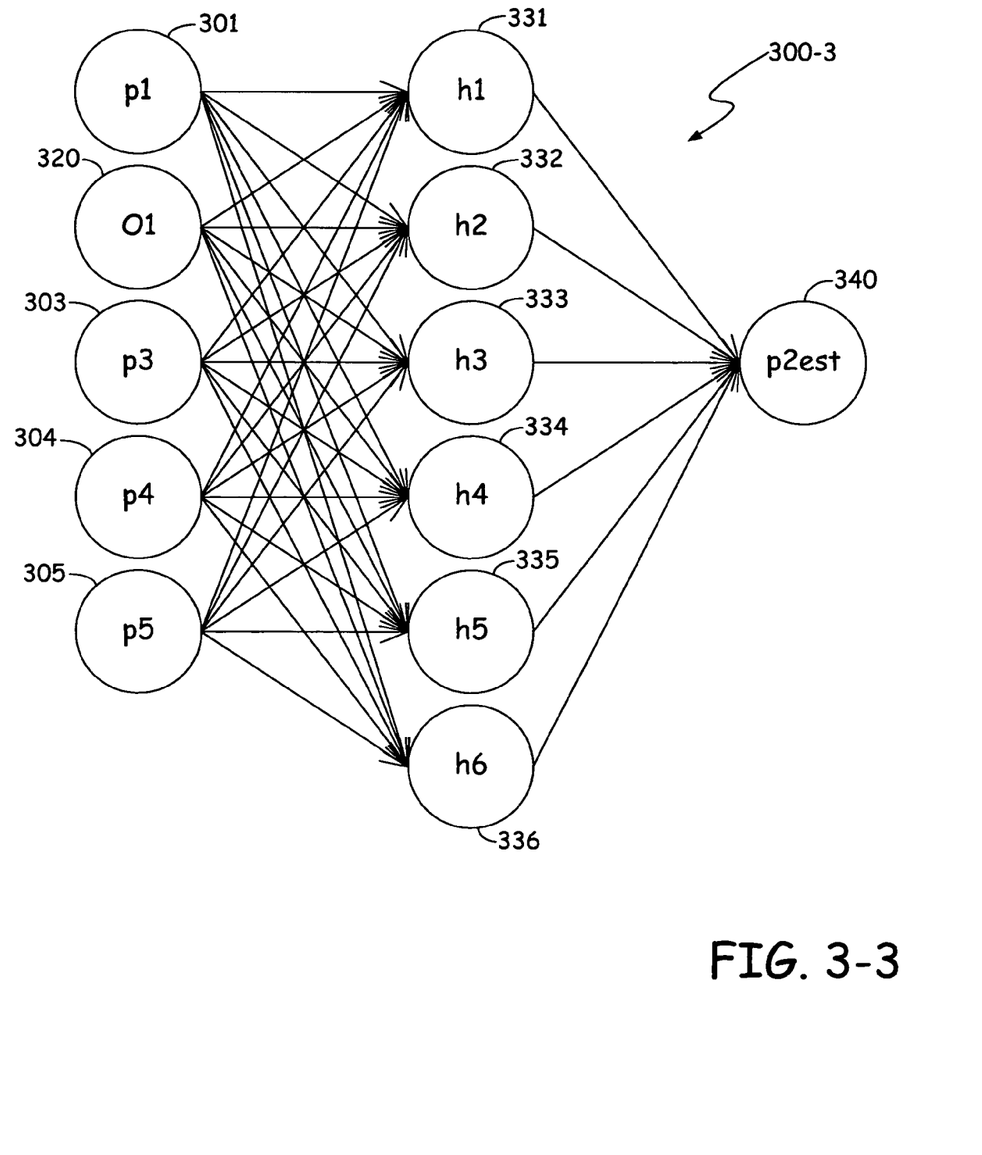
Figure 34:
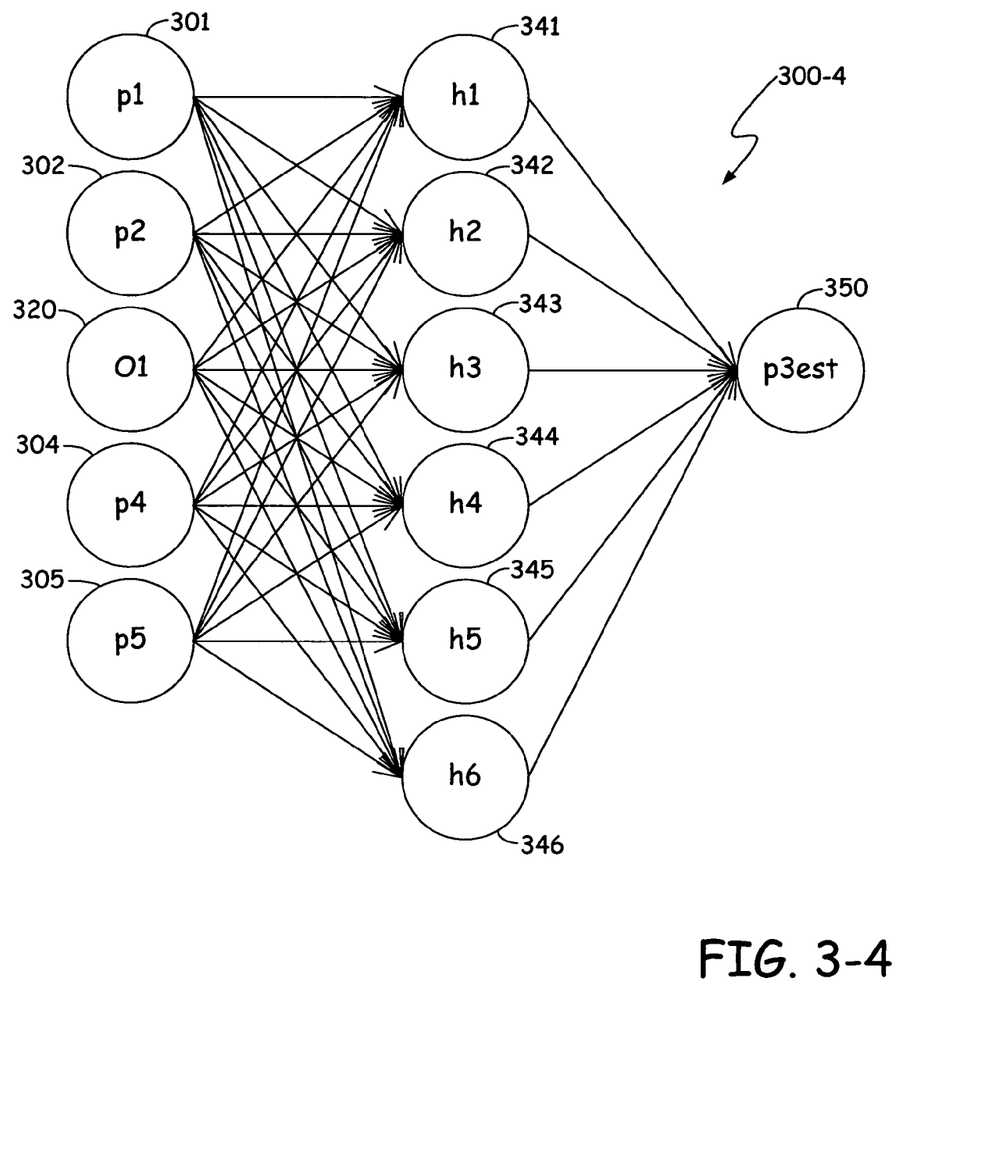
Figure 35:
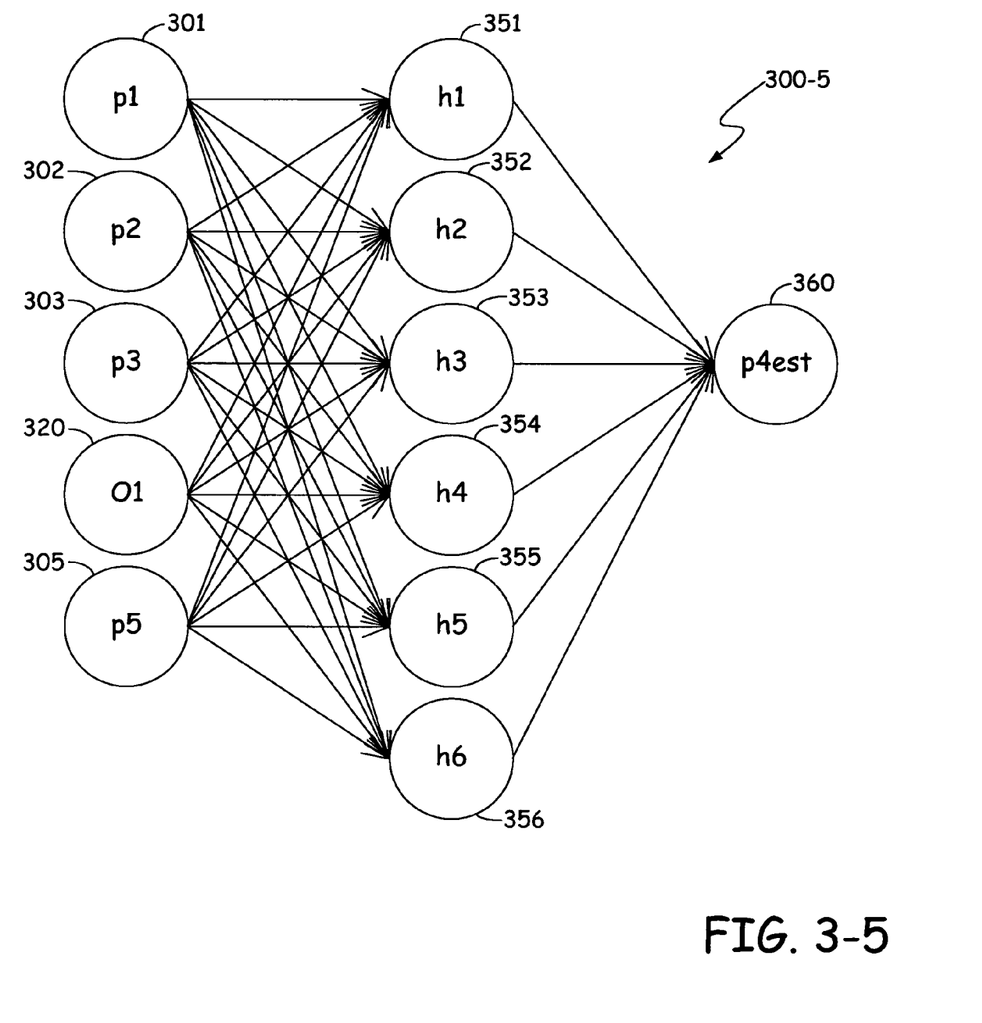
Figure 36:
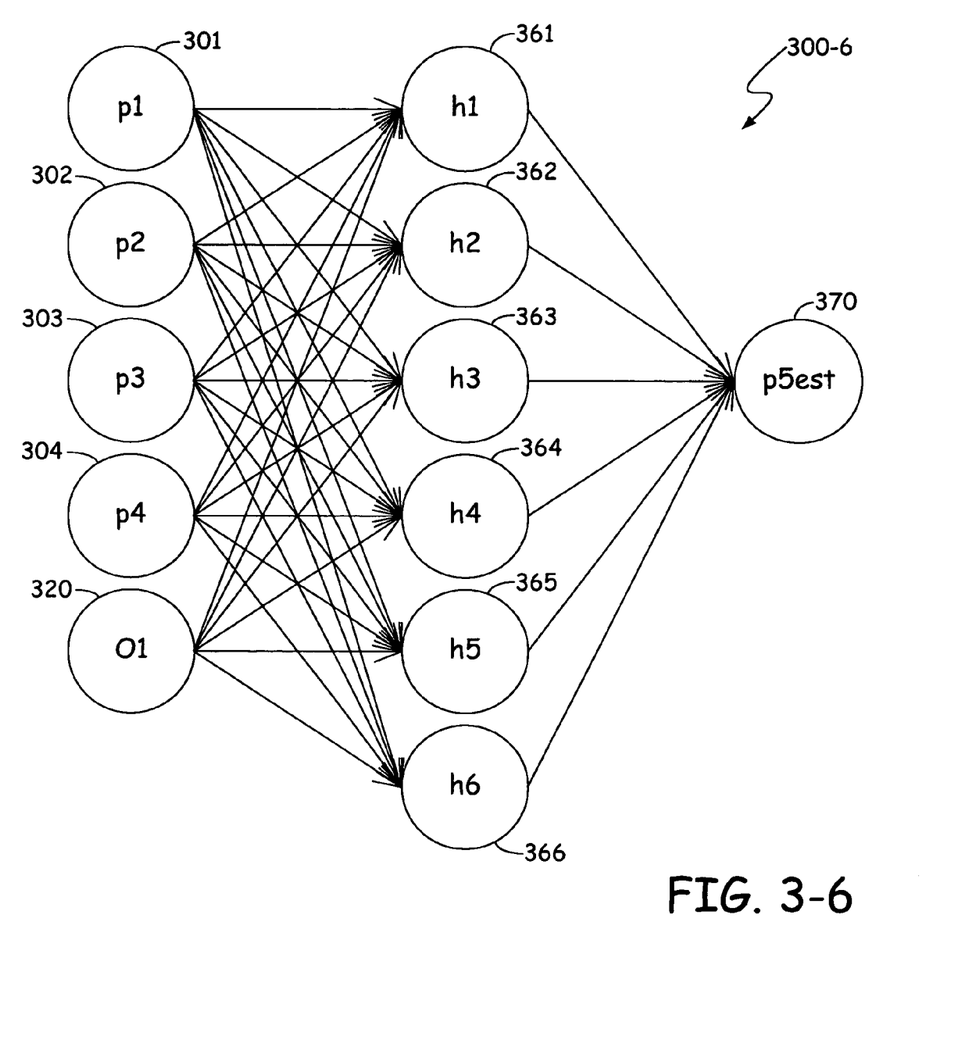

For example, consider neural network 300-2 illustrated in FIG. 3-2. Here, to determine whether port 110-1 (which measures pressure $p_1$) is operating properly, air data output $O_1$ and the remaining measured pressures $p_2$ through $p_5$ are provided as inputs to neural network 300-2. Other information, such as other derived air data parameters, can also be used as inputs to the neural network 300-2 if desired. Using internal nodes 321-326 and output node 330, along with weighting and transfer functions derived during training of neural network 300-2, the neural network generates as an output an estimate $p_{1est}$ of pressure $p_1$. Air data computer 210 can then compare the estimate $p_{1est}$ to measured pressure $p_1$ to calculate the difference between the two, and to verify that the difference is within the corresponding acceptable error value $\epsilon_1$. In the event that the difference between the estimate $p_{1est}$ and the measured pressure $p_1$ is not within the corresponding acceptable error value $\epsilon_1$, air data computer can provide this information as fault isolation information 230. In other embodiments, fault isolation information 230 includes only the pressure estimate or the difference between the pressure estimate and the measured pressure, and other computing circuitry is used to identify the fault.

Similar to neural network 300-2 illustrated in FIG. 2, neural networks 300-3 through 300-6 illustrated in FIGS. 3-3 through 3-6 are used to generate pressure estimates $p_{2est}$ through $p_{5est}$, which can be compared respectively to measured pressures $p_2$ through $p_5$ from ports 110-2 through 110-5 to verify that the differences fall within corresponding respective error values $\epsilon_2$ through $\epsilon_5$. Specifically, with air data output $O_1$ and measured pressures $p_1$ and $p_3$ through $p_5$ as inputs, neural network 300-3 uses internal and output nodes (for example internal nodes 331 through 336 and output node 340) to implement weighting and transfer functions derived during training to generate estimate $p_{2est}$ of pressure $p_2$. With air data output $O_1$ and measured pressures $p_1$, $p_2$, $p_4$ and $p_5$ as inputs, neural network 300-4 uses internal and output nodes (for example internal nodes 341 through 346 and output node 350) to implement weighting and transfer functions derived during training to generate estimate $p_{3est}$ of pressure $p_3$ as is shown in FIG. 3-4. With air data output $O_1$ and measured pressures $p_1$ through $p_3$ and $p_5$ as inputs, neural network 300-5 uses internal and output nodes (for example internal nodes 351 through 356 and output node 360) to implement weighting and transfer functions derived during training to generate estimate $p_{4est}$ of pressure $p_4$ as is shown in FIG. 3-5. Finally, with air data output $O_1$ and measured pressures $p_1$ through $p_4$ as inputs, neural network 300-6 uses internal and output nodes (for example internal nodes 361 through 366 and output node 370) to implement weighting and transfer functions derived during training to generate estimate $p_{5est}$ of pressure $p_5$ as is shown in FIG. 3-6.

It must be noted that an air data system such as the one illustrated in the above-described FIGS. is not limited to FADS. These methods can also be applied to fault isolation of any system that shows dependence between a set of variables, such as air data systems which use other types of pressure sensing probes or devices. These methods can also be applied to fault isolation in air data systems which provide global air data parameters as a function of inputs other than only static pressures. For example, other inputs to a neural network or other artificial intelligence algorithm include measured values indicative of control surface positions, control surface loading, hydraulic pressures or other forces, vehicle mass at take-off, vehicle mass balance, remaining fuel mass, engine thrust or thrust settings, global position system (GPS)/satellite information (altitude, speed, position), altitude or pressure-altitude from an on-board or remote source, air temperature from an on-board or remote source, vehicle acceleration from the inertial system or independent accelerometers, vehicle attitude from the inertial system or independent accelerometers, landing gear position (deployed or not), etc. Consequently, while in example embodiments the neural network inputs illustrated in FIGS. 2 and 3-1 through 3-6 are local static pressures, in other embodiments the inputs illustrated in these FIGS. represent other measured values such as one or more of the above-mentioned value types.

Figure 4:
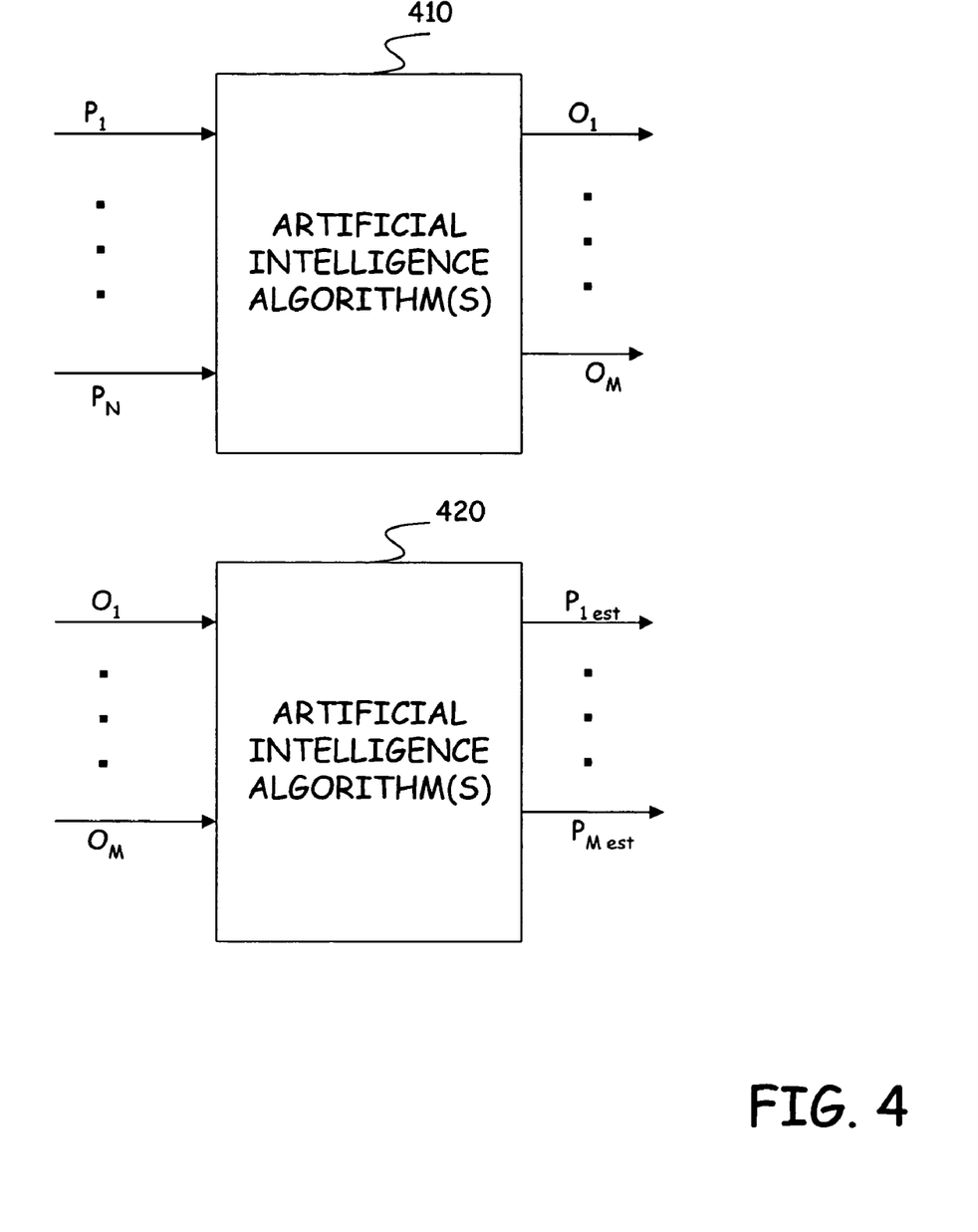
FIG. 4 is a diagrammatic illustration of neural networks and inverse neural networks configured in an alternative embodiment of the present invention.

Referring now to FIG. 4, illustrated is a block diagram of an alternative embodiment of the present invention. In this embodiment, an inverse neural network or other artificial intelligence algorithm is used to generate the estimates of the measured static pressures (or other measured values). As shown at artificial intelligence algorithm implementing circuitry 410, which can be implemented in air data computer circuitry 210 illustrated in FIG. 2, one or more artificial intelligence algorithms are used to generate M air data parameters ("$O_1$" through "$O_M$") using as inputs the N measured values (for example pressures or pressure readings) $p_1$ through $p_N$. As described above, the air data parameters can include, for example, a global angle of attack (AOA), a global angle of sideslip (AOS), a global Mach number, a global static pressure (Ps), and/or a global total pressure (Pt) for the air vehicle.

Then, instead of generating the measured value (static pressure in this example) estimates using a combination of one of the generated air data parameters with a subset of the measured values as was described above, the measured value estimates are generated as a function of the M generated data parameters. This is illustrated at reverse artificial intelligence algorithm implementing circuitry 420, where the inputs for the inverse model are the global air data parameters.

Consider an example in which the M generated air data parameters include Pt, Ps, AOA and AOS, and in which the N measured values are local static pressures. Once the values of Pt, Ps, AOA and AOS are predicted from the pressure values, the inverse model implemented in circuitry 420 has all four of these as inputs with the pressure reading under question as the output. On one hand, if a particular static pressure reading $p_i$ were "bad", it would slightly impact all of the output variables $O_i$ (i.e., Pt, Ps, AOA and AOS). On the other hand, if it were the only faulty input, it should have little impact relative to the difference that would be seen in the inverse method. Said another way, to catch a drifting sensor, while the drift would be difficult to detect as the output variables $O_i$ may be within expected tolerances, the inverse method for fault detection would have a much higher sensitivity and the faulty input would be seen to be outside expected tolerances or "out of bounds".

Figure 5:
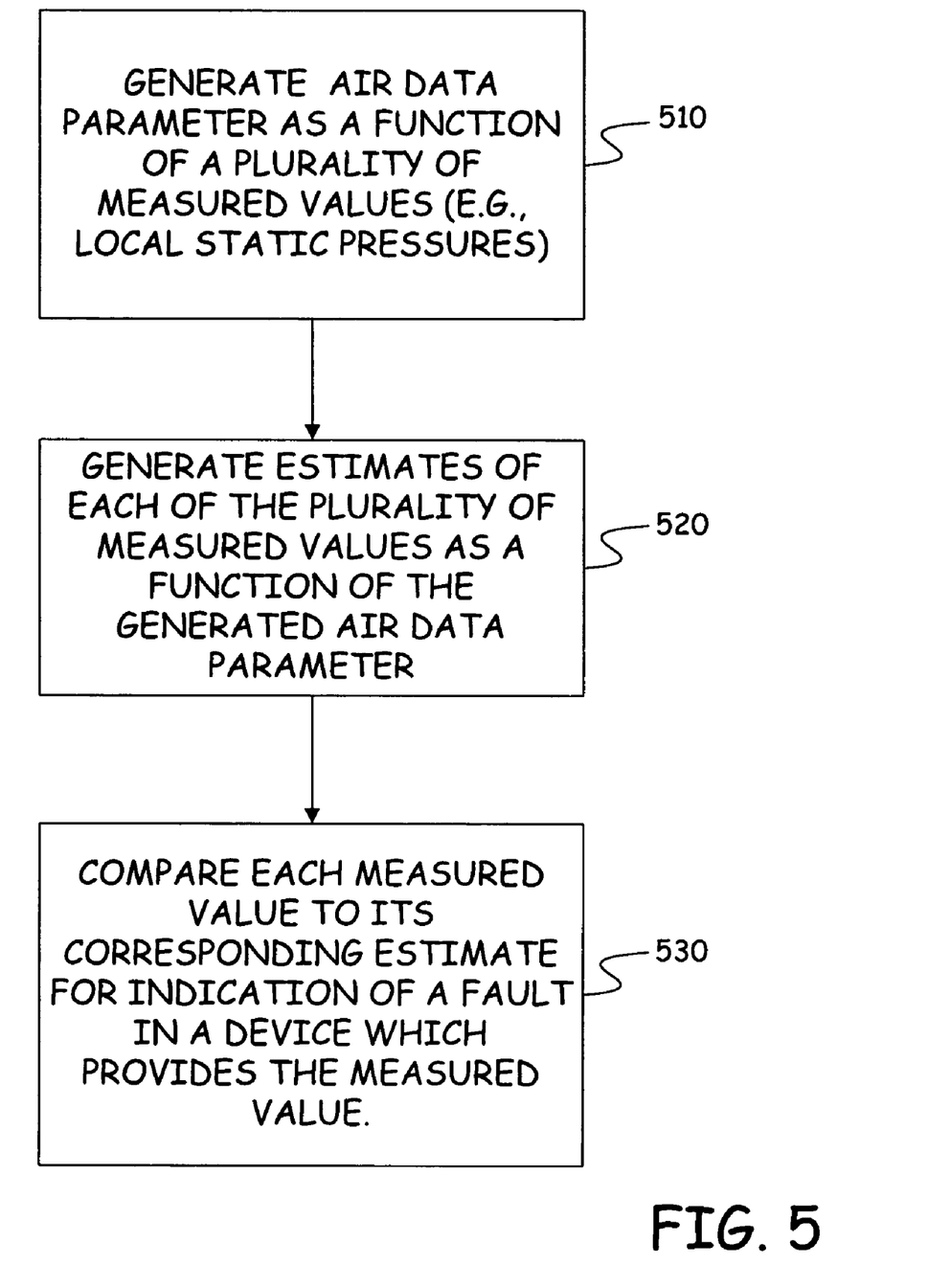
FIG. 5 is a flow diagram illustrating a method of the present invention.

Referring now to FIG. 5, shown is a flow diagram illustrating a method of the present invention in accordance with the above-described embodiments. The method provides fault isolation in an air data system which uses artificial intelligence to generate an air data parameter. As shown at block 510, the method includes the step of generating the air data parameter as a function of a plurality of measured values, such as measured static pressures. Next, as shown at block 520, the method includes the step of generating estimates of each of the plurality of measured values as a function of the generated air data parameter. Finally, as shown at block 530, the method includes the step of comparing each measured value to its corresponding estimate to determine if a difference between the measured value and its corresponding estimate exceeds a threshold and therefore indicates a fault in a device which provides the measured value.

As described above, in some embodiments, the step 520 of generating the estimates of each of the plurality of measured values as a function of the generated air data parameter further includes generating the estimate of each particular measured value as a function of the generated air data parameter and as a function of at least some of the others of the plurality of measured values as described above with reference to FIGS. 3-2 through 3-6.

In other embodiments, step 510 includes generating a plurality of air data parameters as a function of the plurality of measured values. Step 520 then includes generating the estimates of each of the plurality of measured values as a function of the plurality of generated air data parameters as described above with reference to FIG. 4.

Although the present invention has been described with reference to preferred embodiments, workers skilled in the art will recognize that changes may be made in form and detail without departing from the spirit and scope of the invention.

What is claimed is:

1. A method of providing fault isolation in an air data system which uses artificial intelligence to generate an air data parameter, the method comprising:
generating the air data parameter as a function of a plurality of measured values; and
generating estimates of each of the plurality of measured values as a function of the generated air data parameter; and
comparing each measured value to a corresponding estimate to determine if a difference between the measured value and the corresponding estimate exceeds a threshold and therefore indicates a fault in a device which provides the measured value, and thereby providing fault isolation in the air data system.

2. The method of claim 1, wherein generating the air data parameter comprises generating a global air data parameter for an air vehicle.

3. The method of claim 2, wherein generating the global air data parameter as a function of the plurality of measured values further comprises generating the global air data parameter as a function of a plurality of local static pressures.

4. The method of claim 2, wherein generating the global air data parameter as a function of the plurality of measured values further comprises generating the global air data parameter as a function of a measured value indicative of one of a control surface position, a control surface loading, a force, a vehicle mass at take-off, a vehicle mass balance, a remaining fuel mass, an engine thrust, satellite information, an altitude, an air temperature, a vehicle acceleration, a vehicle attitude, and a landing gear position.

5. The method of claim 1, wherein the step of generating the estimates of each of the plurality of measured values as a function of the generated air data parameter further comprises generating the estimate of each particular measured value as a function of the generated air data parameter and as a function of at least some of the others of the plurality of measured values.

6. The method of claim 5, wherein generating the air data parameter as a function of the plurality of measured values further comprises generating the air data parameter using a first artificial intelligence algorithm having the plurality of measured values as inputs.

7. The method of claim 6, wherein generating the estimates of each of the plurality of measured values further comprises generating each estimate using a further artificial intelligence algorithm having the generated air data parameter and at least some of the others of the plurality of measured values as inputs.

8. The method of claim 7, wherein the plurality of measured values includes N local static pressures provided by N static pressure sensing devices, wherein generating the air data parameter further comprises generating a global air data parameter using the first artificial intelligence algorithm having the N measured static pressures as inputs, and wherein generating the estimates of each of the N static pressures further comprises generating each estimate using the further artificial intelligence algorithm having the generated global air data parameter and the N−1 others of the N static pressures as inputs.

9. The method of claim 8, wherein the step of generating the global air data parameter using the first artificial intelligence algorithm further comprises generating the global air data parameter using a first neural network, and wherein the step of generating each estimate using the further artificial intelligence algorithm further comprises generating each estimate using a further neural network.

10. The method of claim 5, wherein generating the air data parameter further comprises generating at least one of an angle of attack for an air vehicle, an angle of sideslip for the air vehicle, and a Mach number for the air vehicle.

11. The method of claim 5, and before the step of generating the air data parameter, further comprising obtaining the plurality of measured values in the form of a plurality of static pressures from a plurality of flush or semi-flush static sensing ports.

12. The method of claim 1, wherein the step of generating the air data parameter as a function of the plurality of measured values further comprises generating a plurality of air data parameters as a function of the plurality of measured values, and wherein generating the estimates of each of the plurality of measured values as a function of the generated air data parameter further comprises generating the estimates of each of the plurality of measured values as a function of the plurality of generated air data parameters.

13. An air data system comprising:
a plurality of static pressure sensing ports each providing one of a plurality of measured static pressures; and
air data computer circuitry configured to use artificial intelligence to generate an air data parameter as a function of the plurality of measured static pressures, and configured to use artificial intelligence to generate estimates of each of the plurality of measured static pressures as a function of the generated air data parameter.

14. The air data system of claim 13, wherein the air data computer circuitry is further configured to compare each measured static pressure to a corresponding estimate to determine if a difference between the measured static pressure and the corresponding estimate exceeds a threshold and therefore indicates a fault in the corresponding static pressure sensing port.

15. The air data system of claim 14, wherein the air data computer circuitry is configured to generate the estimates of each of the plurality of measured static pressures as a function of the generated air data parameter and as a function of at least some of the others of the plurality of measured static pressures.

16. The air data system of claim 15, wherein the plurality of static pressure sensing ports comprises N static pressure sensing ports each providing one of N measured static pressures, and wherein the air data computer circuitry is configured to generate the estimates of each of the N measured static pressures as a function of the generated air data parameter and as a function of the N−1 others of the N static pressures.

17. The air data system of claim 14, wherein the air data computer circuitry is configured to generate a plurality of air data parameters as a function of the plurality of measured static pressures, and is configured to generate the estimates of each of the plurality of measured static pressures as a function of the plurality of generated air data parameters.

18. The air data system of claim 14, wherein the air data computer circuitry is configured to implement the artificial intelligence using neural networks.

19. The air data system of claim 14, wherein the air data computer circuitry is configured to implement the artificial intelligence using support vector machines.

20. The air data system of claim 14, wherein the air data parameter includes at least one of an angle of attack for an air vehicle, an angle of sideslip for the air vehicle, a Mach number for the air vehicle, a static pressure for the air vehicle, and a total pressure for the air vehicle.

21. The air data system of claim 14, wherein the plurality of static pressure sensing ports comprise a plurality of flush or semi-flush static sensing ports.

* * * * *